April 7, 1931.  E. R. SCOTT  1,800,171
COLLAPSIBLE AUTO CANOPY
Filed Sept. 13, 1929  4 Sheets-Sheet 1
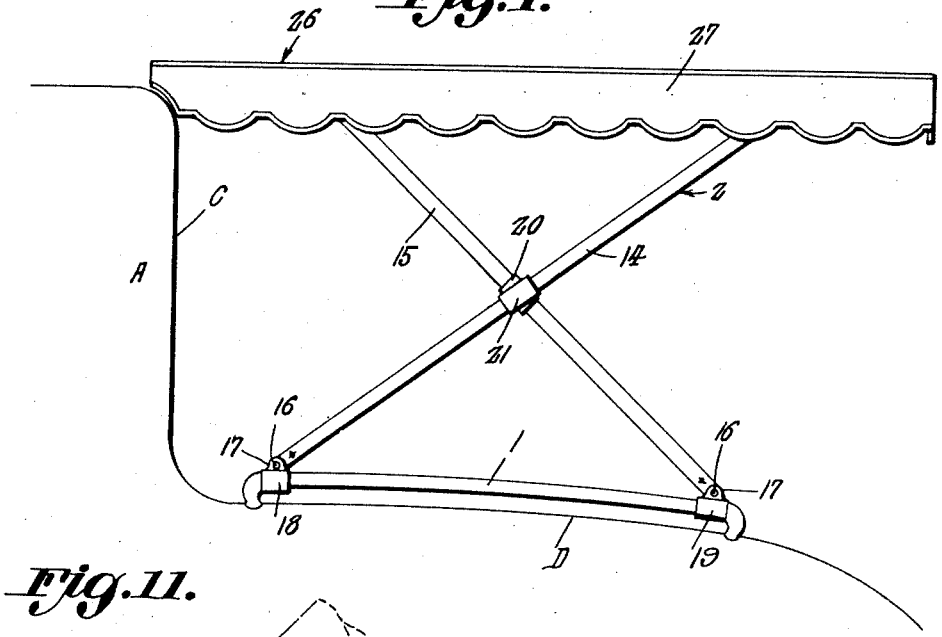
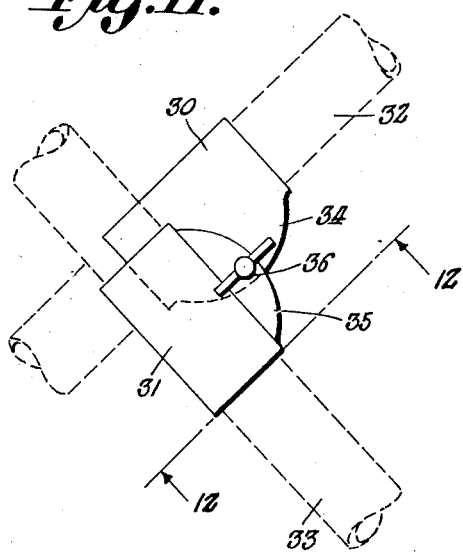
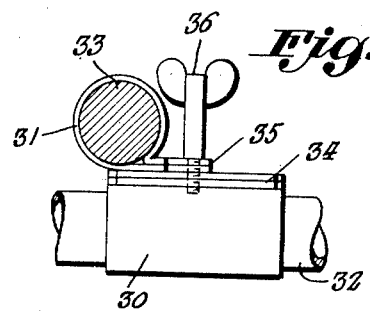
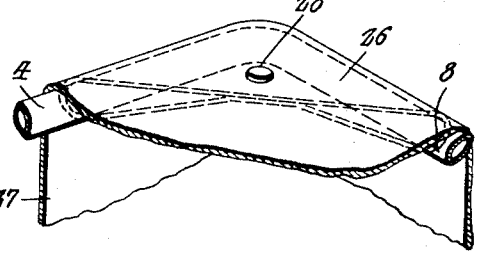
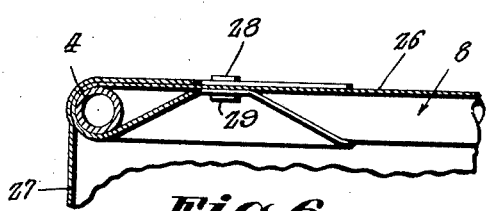
Ernest R. Scott,
INVENTOR
BY Victor J. Evans
ATTORNEY

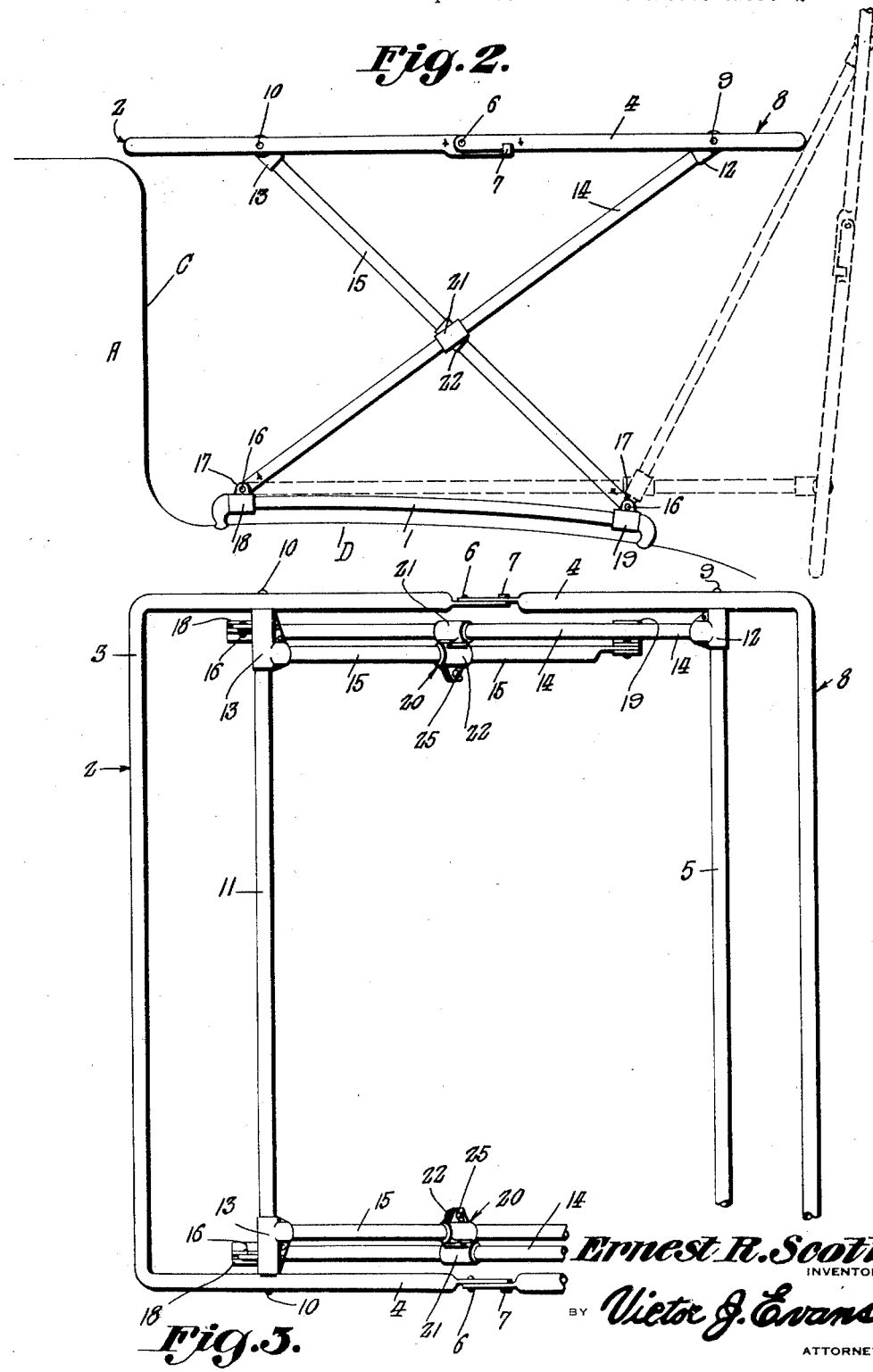

April 7, 1931.    E. R. SCOTT    1,800,171
COLLAPSIBLE AUTO CANOPY
Filed Sept. 13, 1929    4 Sheets-Sheet 3
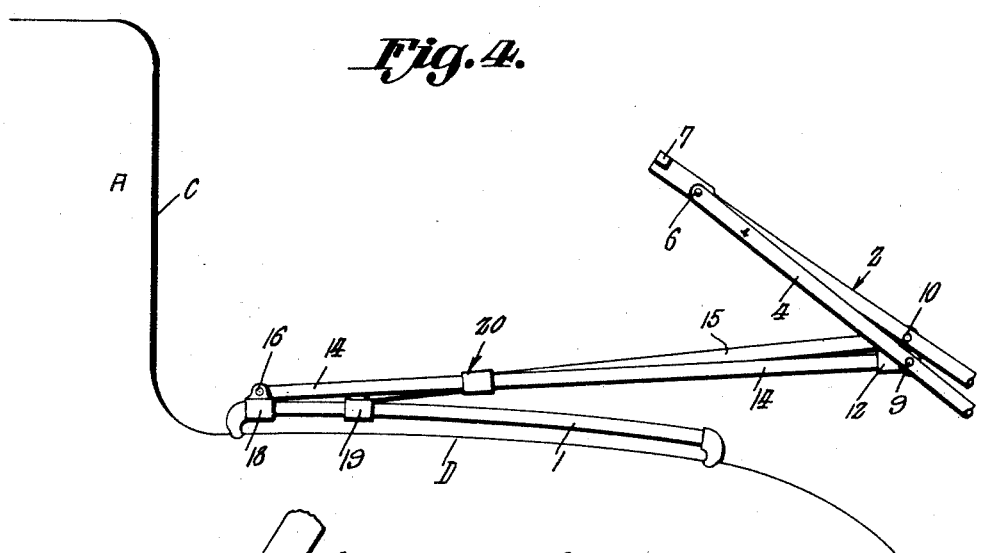
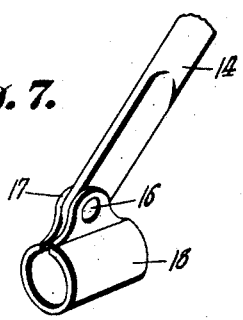
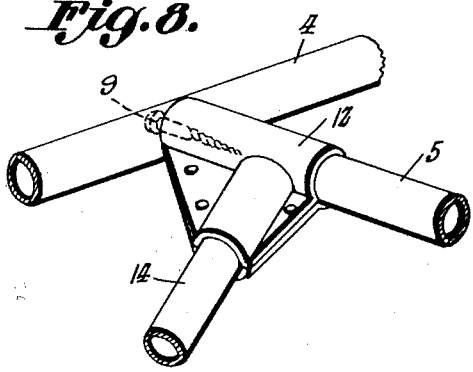
Ernest R. Scott,
INVENTOR
BY Victor J. Evans
ATTORNEY April 7, 1931.  E. R. SCOTT  1,800,171
COLLAPSIBLE AUTO CANOPY
Filed Sept. 13, 1929  4 Sheets-Sheet 4
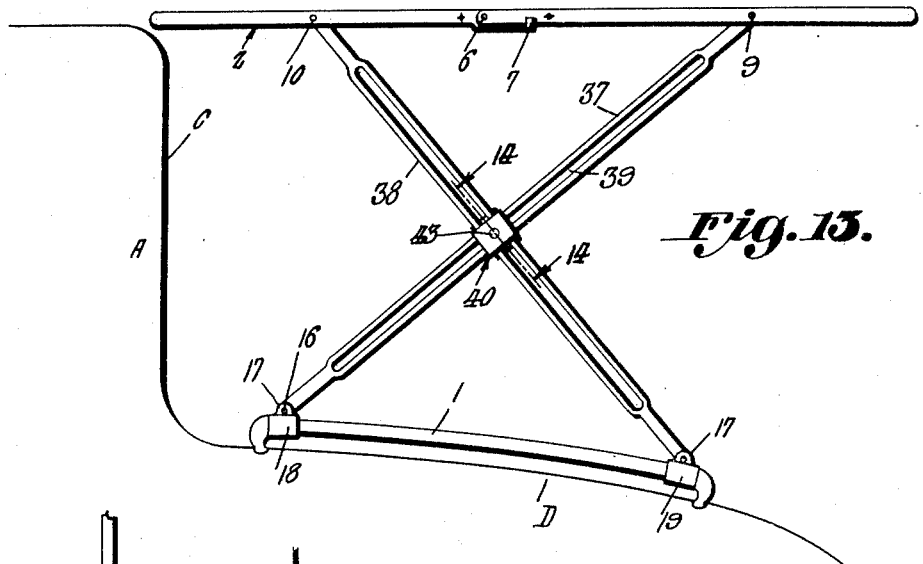
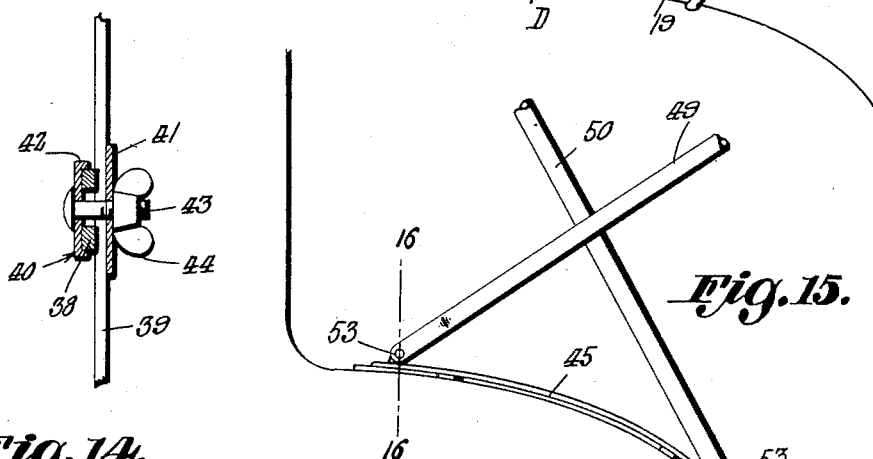
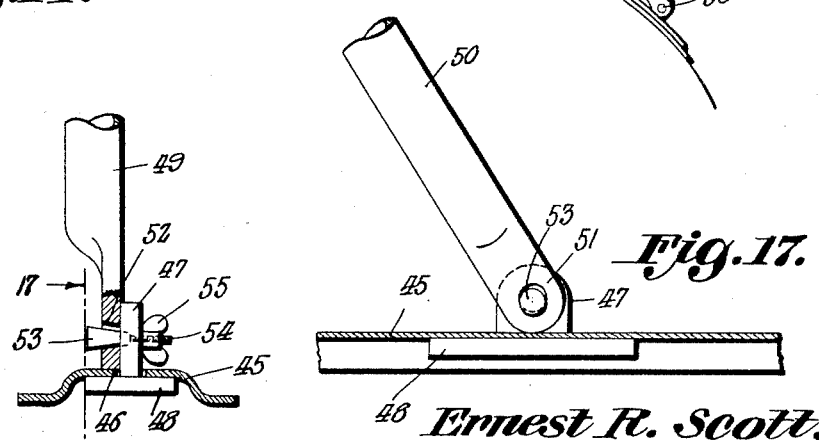
Ernest R. Scott, INVENTOR
BY Victor J. Evans
ATTORNEY Patented Apr. 7, 1931

1,800,171

UNITED STATES PATENT OFFICE

ERNEST R. SCOTT, OF OKLAHOMA CITY, OKLAHOMA

COLLAPSIBLE AUTO CANOPY

Application filed September 13, 1929. Serial No. 392,343.

The invention relates to attachments for motor vehicles of that type having a rumble seat and has for its object the provision of a novel canopy or awning adapted to be mounted upon the vehicle body at the rumble seat for the purpose of protecting the occupants of the seat from the sun or inclement weather.

An important object of the invention is to provide a canopy or awning of this character which is collapsible so as to be entirely out of the way when desired and which is also adjustable so as to shield the passengers from sun or wind coming from different directions.

Another object of the invention is to provide a device of this character which on account of its adjustability may be shifted out of the way to a greater or less extent to accommodate a passenger of unusual stature or to permit passengers to enter or leave the rumble seat without danger of striking their heads against the device.

Another object is to provide a novel device of this character in which the canopy or awning proper, that is to say the flexible portion thereof is detachably connected with the frame so that it may be rolled into a compact bundle for convenience when its use is not desired, the detachability furthermore making it a simple matter to replace the flexible member in case of extraordinary or unusual wear making the same objectionable in appearance or inefficient in service.

Another object is to provide a novel adjustment whereby the movable parts may be securely held in a desired position and be prevented from shifting accidentally.

Another object is to provide a device of this character which may be made extremely ornamental and attractive in appearance, which may be applied to the vehicle without defacing the same in any way, and which will in addition be simple and inexpensive to make, easy to apply and adjust, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which:—

Figure 1 is a fragmentary side elevation of a motor vehicle body of the rumble seat type showing one form of the invention applied thereto and in operative position.

Figure 2 is a side elevation with the cover or flexible member removed to show the frame work home clearly, the normally or extended position shown by full lines and a thrown back position illustrated by dotted lines.

Figure 3 is a top plan view of what is shown in Figure 2.

Figure 4 is a side elevation similar to Figures 1 and 2 but showing the parts in folding position.

Figure 5 is a sectional perspective view through one corner of the canopy itself.

Figure 6 is a detail sectional view therethrough.

Figure 7 is a perspective view illustrating one of the slidable sleeves and the brace connection therewith.

Figure 8 is a detail perspective view illustrating another one of the pivoted connections.

Figure 9 is an enlarged detail elevation looking at the inside of the adjustable connection for the crossed braces.

Figure 10 is a detail section taken on the line 10—10 of Figure 9.

Figure 11 is a view similar to Figure 9 but illustrating a modification.

Figure 12 is a section taken on the line 12—12 of Figure 11.

Figure 13 is a side elevation similar to Figure 2 showing a different form of diagonal brace members and a different adjustment therefor.

Figure 14 is a sectional view taken on the line 14—14 of Figure 13.

Figure 15 is a fragmentary side elevation showing a car body of acute or sharp radius with another modified form of the invention applied thereto.

Figure 16 is a cross section taken on the line 16—16 of Figure 15.

Figure 17 is a detail sectional view taken on the line 17—17 of Figure 16.

Referring more particularly to the drawings, and especially Figures 1 to 10 inclusive, the letter A designates the rear portion of the body of a motor vehicle of that type having a rumble seat. It is well known that in this type of vehicle there is a vertical wall B at the back of the main or enclosed portion of the body and a longitudinally and also generally transversely curved top wall C with which the back of the rumble seat fits flush when the seat is in closed position. Obviously, there are many variations as to the size, shape and proportions of these parts and it is therefore apparent that many variations are possible but that this illustration will be adequate to show the application of the invention.

In carrying out the first form of the invention, I provide a pair of longitudinally extending rails 1 which may be said to be of inverted U-shape and suitably secured upon the top wall C at opposite sides of the rumble seat opening by any suitable means whatsoever, this detail being absolutely immaterial. The attachment itself comprises a rectangular frame indicated as a whole by the numeral 2 and comprises a forward U-shaped frame member 3 having a rule joint connection with rearwardly extending arms 4 mounted on the ends of a transverse bar 5. The actual pivotal connection between the arms of the frame 3 and the arms 4 is designated by the numeral 6 and it should be pointed out that a very convenient construction is to form the rear extremities of the pivoted ends of the arms of the frame 3 with substantially hook-shaped lugs 7 extending beneath the pivoted ends of the arms 4 so as to constitute a species of rule joint. This construction is clearly illustrated in Figures 2 and 3.

It should also be stated that the arms 4 are the sides of a T-shaped frame 8. The transverse member 5 is connected with the arms 4 as shown at 9 in any suitable or preferred manner, it being unnecessary to provide the wood screw connection illustrated in detail in Figure 8 as any equivalent may be provided. Extending transversely of the frame member 2 and connected therewith as by means of the elements 10 is a transverse member 11 similar to the member 5. Mounted on the members 5 and 11 are T's 12 and 13 respectively which may be identical or of a very similar construction, and connected with these respective T's are rod members or braces 14 and 15 pivoted at their ends, as shown at 16, upon ears 17 formed or otherwise provided on sleeves 18 and 19 slidable along the guide rails 1.

In order to hold the frame device thus far described in a selected position, I provide coupling devices for the braces 14 and 15 at each side. Each of these coupling devices is indicated as a whole by the numeral 20 and each includes a pair of sleeve members 21 and 22 engaged respectively upon the arms 14 and 15 in slidable relation thereto. These sleeve members 21 and 22 are pivotally connected in any suitable manner as indicated at 23. The sleeve 21 may be of continuous hollow formation whereas the sleeve 22 is split as shown and provided with terminal ears 24 through which passes a clamping screw 25. The operation will of course be hereinafter explained.

The canopy, awning or shade itself is designated by the numeral 26 and is shown as comprising a sheet of flexible material, such as canvas, rubberized fabric or any other equivalent material covering the assembled frames 2 and 8. Though it is not necessary this canvas covering is disclosed as having a depending valance 27 which may be scalloped or not, as preferred, and which gives a finished and attractive appearance. While it is conceivable that this fabric covering may be attached in different ways, it is here represented as having its corner portions equipped with coacting snap fasteners 28 and 29 and having its corner portions engaged about the corners of the U-shaped frame members 2 and 8 with the coacting snap fasteners engaged as clearly indicated in Figures 5 and 6. By this means it will be apparent that the cover is readily detachable from its frame so that it may be removed entirely and rolled up into a small compact bundle when use of the entire canopy structure is not desired.

In the operation of the invention thus far described, it will be seen that the normal position is as indicated in Figures 1 and 2, the frames 2 and 8 and the fabric covering 26 therefor being arranged horizontally and extending rearwardly from the back wall of the upper portion of the closed body A, the flexible covering consequently serving as a shade, canopy or awning which will protect the occupants of the rumble seat against sun, wind and inclement weather. It will be observed that the means for holding the parts of the frame work in the position shown in Figure 1 consists of the clamping screws 25 which contract the split sleeve 22 about the brace arms 15. Clearly, by loosening the screws 25 so that the pivotally connected sleeves 21 and 22 are slidable with respect to the brace arms 14 and 15, the assembled or aligned frames 2 and 8 carrying the flexible covering 26 may be tilted rearwardly to a greater or less extent, as indicated by dotted lines in Figure 2, the brace arms 14 and 15 then sliding through the sleeves 21 and 22 and the slides 18 moving rearwardly along the guide rails 1 so that the canopy itself may be arranged at a desired angular position with respect to the body of the car and the occupants of the rumble seat. This is a great advantage as it makes it possible for the device to be moved entirely out of the way when passengers are getting into or out of the rumble seat. Another feature of advantage in this construction is that the canopy may be tilted back sufficiently to avoid interfering with the head of a passenger of unusual stature. Still another advantage of this construction is that the canopy may be arranged at a desired angle with respect to the body of the car so as to protect the passengers of the rumble seat from sun or wind at the rear of the car, as for example when the passengers are sitting and viewing forts, scenes or the like, or even traveling along the road. Of course any desired adjustment is maintained simply by tightening the clamping screws 25 which will result in squeezing or contracting the sleeve 22 about the arms 15 so that the arms and consequently the other parts of the frame cannot move relatively.

When use of the device is not desired at all it is apparent that the clamping screws 25 may be loosened whereupon the brace arms 14 and 15 may both be swung downwardly as shown in Figure 4, the sleeves 21 and 22 moving toward the slides 18 and 19, the slides 18 moving to the forward extremities or remaining at the forward extremities of the guide rods 1 and the sleeves 19 moving forwardly to positions adjacent the sleeves 18. The fabric covering 26 must of course then be detached from the aligned frames 2 and 8 subsequently to which the frame 2 may be swung upwardly and rearwardly so as to lie substantially upon the frame 8 as clearly illustrated in Figure 4, the peculiar rule joint connection permitting this action. The superposed frame members 2 and 8 are then swung downwardly onto the substantially registering or aligning brace arms 14 and 15 as will be readily apparent. The fabric covering itself may be left attached to the two corners of the frame 8 or may be entirely detached, rolled up and stowed away inside the vehicle in some convenient place.

Instead of using the pivotally connected sleeve members 21 and 22 as shown in the above described Figures 1 to 10 inclusive, I may make use of an alternative construction such as that illustrated in Figures 11 and 12 wherein I have shown a pair of sleeve members 30 and 31 disposed upon brace arms 32 and 33, corresponding to the brace arms 14 and 15. These sleeves 30 and 31 are represented as having, respectively, laterally extending flange portions 34 and 35 arranged in superposed relation and connected by a clamping screw 36, the arrangement being such that when the clamping screw 36 is loose the assembled sleeve members 30 and 31 will permit the brace arms 32 and 33 to slide therethrough, and when the clamping screw is tightened relative pivotal movement of the sleeves 30 and 31 will be prevented and at the same time they will clampingly engage upon the brace arms so as to be capable of any movement with respect thereto. Clearly, this form of pivotal connection may be employed in lieu of that illustrated generally at 20 in the first described form of the invention. The operation in this case would of course, be exactly the same as that above described.

In Figures 13 and 14 I have illustrated yet another modification in which use is made of brace bars 37 and 38, corresponding to the brace bars 14 and 15 but formed with longitudinal slots 39 which extend throughout the major portion of their length. In this adaptation the clamping device, corresponding to the structure 20 above described in connection with the first form, is indicated generally by the numeral 40 and includes a washer 41 disposed against each of the brace bars 39, a slide 42 disposed against each of the brace bars 38, and a clamping bolt 43 extending through the slide 42 and the washer 41 and through the longitudinal slots 39 in the brace bars, this clamping bolt is equipped with a wing, thumb or other suitable nut 44. The operation of this form is identically the same as that in the above described form the only difference being that the clamping screws 25 previously described are replaced by the clamping bolt 42 carrying the nut 44. Of course, there is the other difference that in this instance the brace bars are longitudinally slotted and it therefore becomes unnecessary to make use of the split cylindrical sleeves 21 and 22. In every other respect the construction in regard to the main frames 2 and 8 and the flexible covering therefor is exactly the same.

In Figures 15, 16 and 17 I have shown yet another modification which is particularly adapted for use in connection with that type of motor vehicles where there is a very acutely or abruptly curved top surface where the rumble seat is located. Referring to these figures in detail it will be observed that I have founded upon the top of the rear portion of the car at each side of the rumble seat opening a guide device formed as a centrally upwardly offset channel member 45 having a longitudinal slot 46 therein through which extends an upstanding gear 47 on a plate 48 slidably mounted within the confines of the channel bar. The brace bars 49 and 50, corresponding to the brace bars 14 and 15, 32 and 33, or 38 and 39 are provided at their lower ends with apertured ear portions 51 with relatively large tapered openings 52 therein through each of which extends a tapered head 53 of a bolt 54 which extends through a suitable opening in the associated or adjacent gear 47 and which carries a clamping nut 55. In this form of the invention it is apparent that the operation is the same as that above described except that the peculiarly formed bolts 54 are provided at the pivotal connections of the brace arms with the slide plates 48.

It is obvious that when the nuts 55 are turned down the tapered heads 53 of the bolts 54 will be drawn into the tapered openings 52 and will jam therein so that there will be a positive and tight lock which will absolutely prevent any undesired movement of the brace arms 49 and 50. When the clamping nuts 55 are loosened it is of course apparent that the brace arms 49 and 50 may be moved in exactly the same manner as the brace arms above described so that the position of the canopy itself with respect to the occupants of the rumble seat may be varied or so that the frame of the canopy may be bolted down into inoperative position when use thereof is not desired, for any reason.

In all forms of the invention, it should be understood that there is no limitation as to the exact construction of these various structural elements though as a matter of fact it is very probable that a tubular construction is preferable owing to the lightness combinted with the strength and rigidity of such a structure. However, this is a mere manufacturing detail and it should also be understood that there is no restriction whatsoever as to the finish as the various parts might be brass, nickel-plated, lacquered, painted or otherwise treated to have a pleasing and ornamental appearance in harmony with the finish of the car itself. Likewise there is no restriction as to exact material from which the flexible cover itself is formed. Any and all of the fittings may be finished in any desired manner so as to harmonize with the general assembly and give a tone of attractiveness.

From the foregoing description and a study of the drawings it is apparent that I have thus provided a very simply constructed, inexpensive and easily applied and adjusted device for the purpose specified and one which will be a great comfort to the passengers or occupants in rumble seats of roadsters, coupes, or the like, the effect being exactly as advantageous as if the entire car were enclosed. As a matter of fact the canopy may be adjusted to various angular positions to accommodate persons of different stature and to meet different conditions so that the maximum degree of comfort can be attained. It is really believed that the construction, operation and advantges should and will be readily understood by one skilled in the art without further explanation.

While I have shown and described various modifications of the invention, it should of course be understood that I reserve the right to make all such changes in the details of construction as well as in the arrangement and combination of parts as will not depart from the spirit of the invention or the scope of the subjoined claim.

Having thus described the invention, I claim:—

A canopy for automobiles comprising a collapsible frame, a cover for the frame T-shaped members secured to the frame, transverse bars connecting the T-shaped members in pairs, pairs of crossed supports secured to the T-shaped members, pivotally connected parts of sleeves mounted on said supports where the latter cross each other and one sleeve of each pair split, fasteners adjustably securing the ends of the split sleeves for holding said sleeves in adjusted positions on said supports, rails secured to a vehicle body and having the free ends of the supports slidably secured thereto.

In testimony whereof I affix my signature.

ERNEST R. SCOTT.